US008337294B2

(12) United States Patent
Sharkov et al.

(10) Patent No.: US 8,337,294 B2
(45) Date of Patent: Dec. 25, 2012

(54) SYSTEM AND METHOD FOR GENERATING AND PLACING COMBINATION BETS

(75) Inventors: Alexander Sharkov, Sofia (BG); Rumyana Uzunova, Sofia (BG); Michael Maerz, Gibraltar (GI); Damon Barnard, Cadiz (ES)

(73) Assignee: PartyGaming IA Limited, Hamilton (BM)

( * ) Notice: Subject to any disclaimer, the term of this patent is extended or adjusted under 35 U.S.C. 154(b) by 253 days.

(21) Appl. No.: 12/884,103

(22) Filed: Sep. 16, 2010

(65) Prior Publication Data

US 2012/0071223 A1 Mar. 22, 2012

(51) Int. Cl.
*A63F 9/24* (2006.01)
*A63F 13/00* (2006.01)
*G06F 17/00* (2006.01)
*G06F 19/00* (2011.01)

(52) U.S. Cl. .................. 463/20; 463/9; 463/16; 463/17; 463/21; 463/25

(58) Field of Classification Search ..................... 463/20
See application file for complete search history.

(56) References Cited

U.S. PATENT DOCUMENTS

| | | | | |
|---|---|---|---|---|
| 5,560,603 | A | 10/1996 | Seelig et al. | |
| 5,888,136 | A | 3/1999 | Herbert | |
| 6,093,101 | A | 7/2000 | Mourad | |
| 6,135,885 | A | 10/2000 | Lermusiaux | |
| 6,152,822 | A | 11/2000 | Herbert | |
| 6,236,900 | B1 * | 5/2001 | Geiger | 700/91 |
| 6,309,307 | B1 | 10/2001 | Krause et al. | |
| 6,331,148 | B1 | 12/2001 | Krause et al. | |
| 6,358,150 | B1 | 3/2002 | Mir et al. | |
| 7,458,891 | B2 | 12/2008 | Asher et al. | |
| 7,585,219 | B2 | 9/2009 | Randall et al. | |
| 7,587,214 | B2 | 9/2009 | Inselberg | |
| 7,637,807 | B2 | 12/2009 | Asher et al. | |
| 7,740,539 | B2 | 6/2010 | Simon | |
| 7,753,770 | B2 | 7/2010 | Walker et al. | |
| 2003/0060268 | A1 * | 3/2003 | Falconer | 463/20 |
| 2005/0245306 | A1 * | 11/2005 | Asher et al. | 463/16 |
| 2010/0041453 | A1 | 2/2010 | Grimm, Jr. | |

* cited by examiner

*Primary Examiner* — Michael Cuff
*Assistant Examiner* — Kevin Y Kim
(74) *Attorney, Agent, or Firm* — Beem Patent Law Firm

(57) ABSTRACT

A method and system for generating and receiving a combination bet may include presenting a plurality of betting events in a display resembling a slot machine. In one embodiment, the user may place a total wager for a combination bet prior to knowing what the betting events are. Placing the bet may "spin" the reels to randomly generate a plurality of betting events, and success in the combination bet may require that each individual bet is a winner. In another embodiment, the user may be able to "spin" the reels prior to placing the bet. Betting events still may be randomly generated, but the user may have the ability to select the events on which to wager. Events may comprise in-live sporting events, and the user may have the ability to select various event features, such as the type of events displayed and the odds for each event, in order to customize the betting experience to the user's interests and risk tolerance.

20 Claims, 11 Drawing Sheets

FIG. 8
gamebookers
COMBI
SLOTS
Mini Chain Reactors
78

84

SYSTEM AND METHOD FOR GENERATING AND PLACING COMBINATION BETS

BACKGROUND OF THE INVENTION

1. Field of the Invention

The present invention is directed to a system and method for generating and placing combination bet, particularly combination bets based on a plurality of in-live events such as sporting events.

2. Description of the Related Art

Sports books typically allow bettors to wager on any number of events. With regard to sporting events, in addition to picking the winners, bettors may be able to bet on seemingly random occurrences. For example, it may be possible to bet on the identity of the next player to score any point, score a particular type of point, e.g., a touchdown in football or a three-point basket in basketball, or to commit a foul.

Bettors may have to wade through a vast amount of possible bets in order to find one that appeals to them. First, they may have to select a sport, then a particular sporting event, and then find a bet that is being offered on which to bet. This process can be time consuming and can limit the number of bets that the user may place. In addition, while searching for a suitable bet, many bets may expire due to the betting event occurring, while newer bets may be generated to replace them. In addition, odds for each bet can change during the process of finding something to bet on because of the in-live nature of the wagering. Keeping track of all of these changes may be difficult and confusing to the bettor.

Because so many different bets may be created, a user looking to place an in-live bet may become overwhelmed in attempting to find one or more bets on which to wager. In addition, this process may be amplified if the better seeks to place a combination bet that relies on the independent results of a plurality of betting events. Once the user finds a first attractive bet, enough time may pass before the user finds a second, third, fourth, etc., bet to put together a combination bet that the event on which the first bet was based may have occurred, nullifying that bet. Alternatively, the event may not have occurred, but the odds may have changed to be less favorable to the user.

What is needed is a game that overcomes the drawbacks described above.

BRIEF SUMMARY OF THE INVENTION

In one aspect, a method for generating and receiving a combination bet may comprise: establishing a plurality of betting events; receiving a total wager amount; randomly selecting a subset of the plurality of betting events; verifying that each event in the subset has not occurred; accepting the combination bet; and determining whether the combination bet is a winner. The method also may include displaying the subset to a user as entries in a plurality of slot machine-type reels. The determining step may comprise determining whether each event in the subset is a winner. In addition, the establishing step may comprise: receiving a user-defined list of betting event categories; cross-checking available betting events with the categories; and selecting available betting events matching the categories. Alternatively, the establishing step may comprise: receiving a user-defined range of acceptable odds for each event; cross-checking odds for each available betting event with the range; and selecting available betting events falling within the range.

The method also may include updating odds for each available betting event; cross-checking the updated odds for each available betting event with the range; and updating the plurality of betting events to include events with updated odds falling within the range and to remove events with update odds falling outside the range. The method also may include: indicating a status of each event in the subset; and displaying an update to the status when the status changes.

In another aspect, a method for generating and receiving a combination bet may comprise: establishing a plurality of betting events such as sporting events; randomly selecting a first subset of events from the plurality of betting events; displaying the first subset of events to a user; receiving a request from the user to keep or discard one or more events within the subset; randomly selecting a second subset of events from the plurality of betting events; replacing discarded events with the second subset of events; establishing a combination bet comprising kept events from the first and second subsets; and receiving a wager for the combination bet. The displaying step may include displaying a plurality of slot-machine-like reels and inserting a separate event from the first subset in each of the reels. In addition, the selecting steps may comprise cycling between potential betting events to imitate spinning slot machine reels.

The method also may include calculating odds for the combination bet, calculating a possible payout for the combination bet, and displaying the wager, odds, and possible payout. Additionally, the method may include displaying odds for each event in the subsets and updating the odds substantially in real time.

The selecting steps may include verifying that each event in the subsets does not conflict with any other event in the subsets so that no impossible combination bets are created. Similarly, the selecting steps may include verifying that each event in the subsets is not a duplicate of any other event in the subsets, which may avoid multiplying the user's potential payout.

In still another aspect, a system for generating and receiving a combination bet may comprise: a user interface for displaying a plurality of betting events, wherein the events are arranged to resemble a plurality of slot machine reels and a combination bet comprises combining a bet from each reel. The user interface further may comprise a toggle for adjusting a bet amount and status indicators for each displayed betting event. In addition, the system may include one or more databases, collectively "a database," for storing information relating to the plurality of betting events. For each event, the database information may include an event identifier, an event-type identifier, event participants, and odds for the event, where the odds may be updated substantially in real time.

The user interface further may include a user-selectable list of event types, where the displayed plurality of betting events has an event type matching a user-selected event type. In addition, the status identifiers may be updated to reflect a win or a loss as each betting event is resolved.

These and other features and advantages are evident from the following description of the present invention, with reference to the accompanying drawings.

DETAILED DESCRIPTION

A system and method for presenting a user with a plurality of bets for forming one or more combination bets. The system includes a user interface 10 that may resemble the reels of a slot machine, and choosing or adjusting one or more of the bets may resemble spinning the reels of a slot machine. This interface 10 may appeal to casino players by allowing them to bet using a casino-like combo slot feature 12 that allows the players to place combo bets quickly and have those bets settled presently.

Bets preferably are generated from standard in-live betting events, i.e., events that are in progress when the user is betting or that will begin shortly. For example, bets may relate to sporting events such as tennis, football (soccer), football (American, Australian, etc.), rugby, cricket, baseball, basketball, hockey, jai alai, horse racing, dog racing, etc. In-live bets also may relate to various occurrences within each sport. For example, possible bets in tennis may include the match winner, a certain set or game winner, the winner of a certain point in a certain set of a certain match, the identity of the next player to double-fault, etc. In basketball, exemplary bets may include the winner, the over/under, the point spread, the high scorer, the next player to commit a foul, the next player to hit a three-point field goal, the next player to make a free throw, etc.

The system may help alleviate the problem of the user missing out on combination bets because of too long of a delay in placing the bet by substantially contemporaneously presenting the user with a plurality of different bets and the ability to combine multiple distinct bets into one combination bet or "combi-bet" that relies on the outcome of each individual bet to determine whether the combi-bet is a winner. The user interface 10 may take the appearance of a slot machine, with a plurality of reels 14, 16, 18 that appear to spin as potential bets are generated. However, unlike slot machines or other slot-type games, the reel displays when the reels stop spinning do not automatically determine whether the user has won or not. Instead, the reels display a series of bets 20, 22, 24 for yet-to-occur events, and the outcome of those events determines whether the user wins the bet or not.

While the system allows the user to wager on substantially any bet, the system preferably may present the user with more short-term or soon-to-be-resolved bets. In this manner, any number of potential bets may be created and presented to the user. In addition, the user quickly may be able to determine whether the combination bet is a winner or not. This short waiting period may provide the user with a short waiting period to determine if he is a winner. In addition, if the user waits until the combination bet is resolved to place another bet, minimizing bet resolution time may lead to more bets being placed, which may lead to a greater take for either the house or the user, depending on the bet outcomes.

Figure 1:
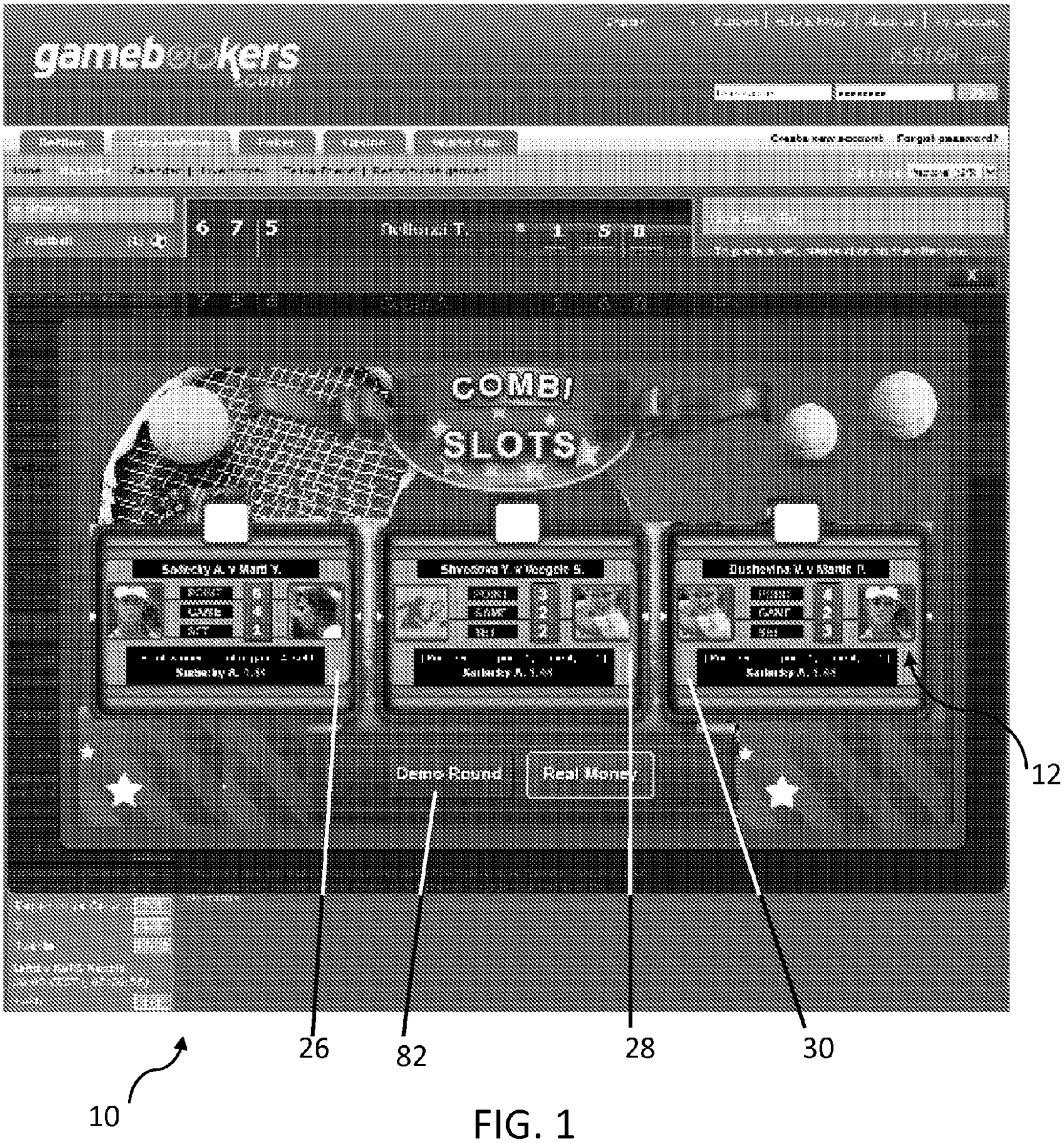
FIG. 1 is a screenshot of an exemplary initial screen for placing a randomly generated combination bet.

The user interface 10 may include a display such as a computer screen that may present a plurality of in-live bets to the user. Because the system creates a combination bet, the system preferably includes a plurality of reels 14, 16, 18. For example, the system may include between about two and about six reels, preferably between about three and about five reels, although additional reels are possible. In the example shown in FIG. 1, the system includes three reels 14, 16, 18 that each display tennis-related bets in a sequence of windows 26, 28, 30.

Figure 7:
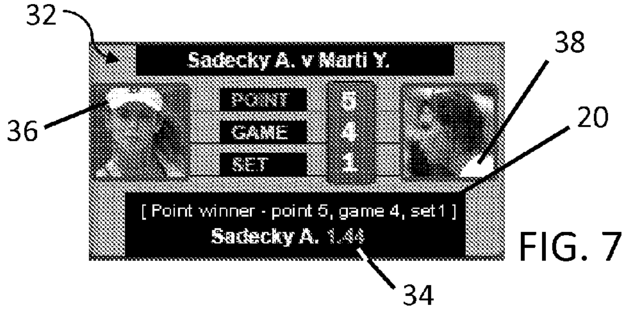
FIG. 7 is a screenshot of an exemplary slot reel entry.
Figure 11:
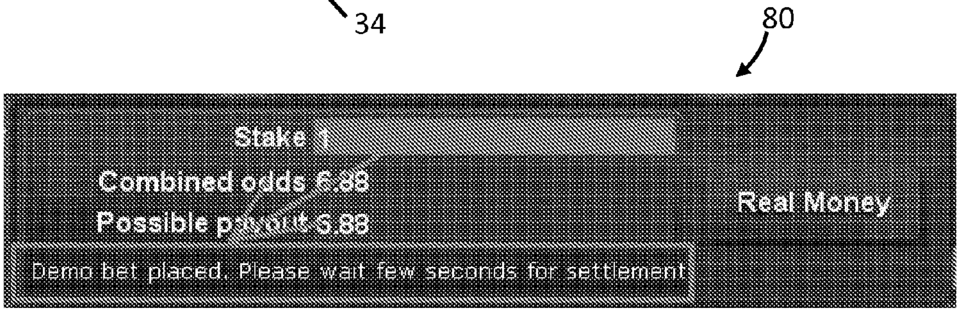
FIG. 11 is a screenshot of a demonstration explaining bets placed, combined odds, and total possible payout.
Figure 12:
FIG. 12 is a screenshot of a demonstration showing a winning combination bet option.
Figure 13:
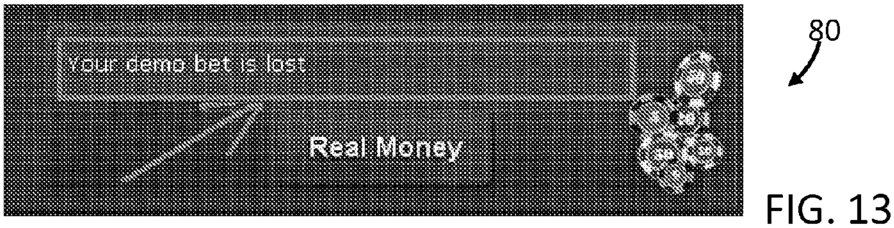
FIG. 13 is a screenshot of a demonstration showing a losing combination bet option.
Figure 14:
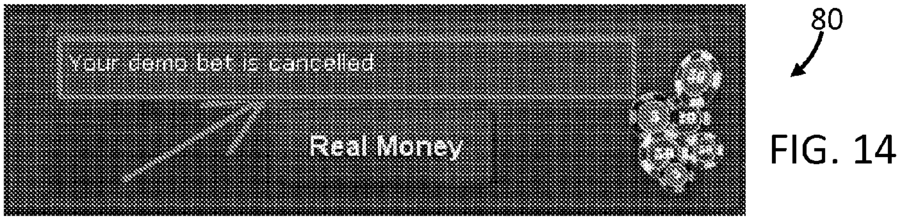
FIG. 14 is a screenshot of a demonstration showing a cancelled bet option.

The information displayed to the user preferably is substantially similar the information ordinarily available to a user on a standard betting slip, allowing the user to evaluate the wager sufficiently. As seen in FIG. 7, each window may include bet-related information, including the event, names of participants or other participant-identifying information 32, the specific bet 20, and odds for that bet 34. The system may include user preferences to allow the user to select the language in which information is disclosed. In addition, the system may include user preferences to set the display type for the odds. For example, odds 34 may be displayed as a decimal, a fraction, a ratio, or in any other manner understandable by a user. Odds 34 for each event may change at any time, and the system preferably updates the odds 34 displayed to the user substantially in real time to reflect those changes. In addition, if betting closes on an event, the system preferably removes that event from the reel window 26, 28, 30 and replaces it with another event, randomly selected from among the plurality of possible betting events.

Each window also may include an image 36, 38 of the participant(s) to the betting event, which may allow for quicker visual recognition and understanding of the bet. In another embodiment, the system may replace or supplement the images with video of the betting event. The system also may overlay audio of the betting event. This feature may be available prior to the bet being placed so that the user may be able to evaluate the state of play. Alternatively or additionally, it may be available after the bet is placed so that the user may be able to see how the bet unfolds. Because the system allows the user to place a combination bet covering multiple betting events, audio and/or video may be selectively enabled and disabled in order to avoid confusion and preserve bandwidth. For example, the user may be required to select the reel 14, 16, 18 for which audio and/or video coverage may be desired, which may activate the coverage for the event in that reel and deactivate the coverage for the events in the other reels.

The system may include one or both of a predetermined minimum and maximum wager value. For example, the minimum wager value may correspond to the minimum live betting value, rounded up to the nearest bigger integer number, and the maximum theoretical wager may be a factor of the minimum value, e.g., about 100 times the minimum value. Additionally, the maximum actual value may be the lesser of the maximum theoretical value and the user's account value. Preferably, wager increments may be whole numbers, e.g., one dollar, euro, credit, etc.

Figure 2:
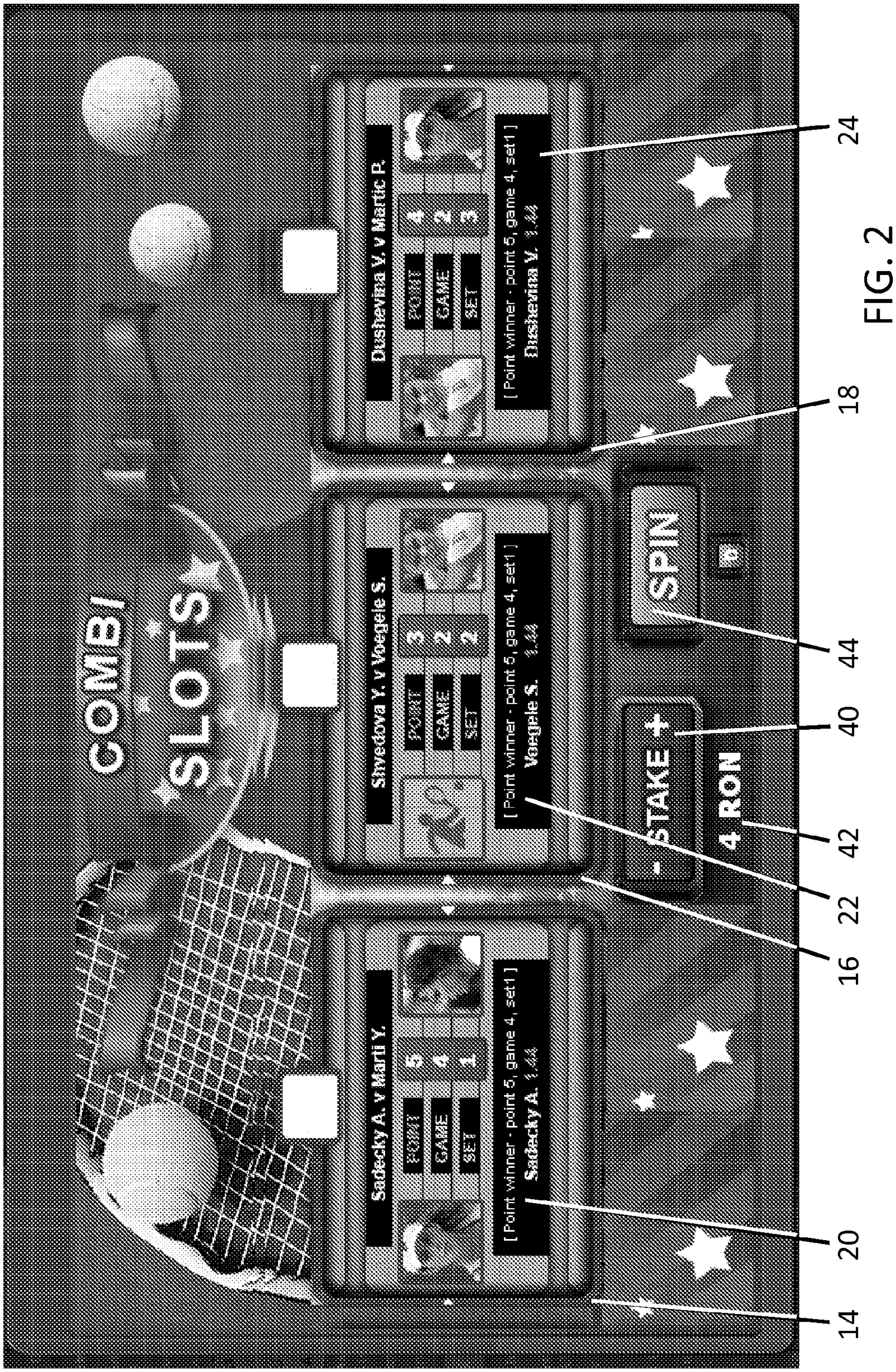
FIG. 2 is a screenshot showing the ability to alter a wager amount or to spin one or more of the slot reels.

Turning to FIG. 2, in one embodiment, the system may include an option such as a toggle 40 or plus (+) and minus (–) buttons to increase or decrease the wager or stake amount, and the amount wagered 42 may be displayed proximate the toggle 40. If the current wager or stake is the system minimum, then the wager decrease option (–) may disappear or be displayed as inactive. Similarly, if the current wager or stake is the system maximum, then the wager increase option (+) may disappear or be displayed as inactive.

Figure 5:
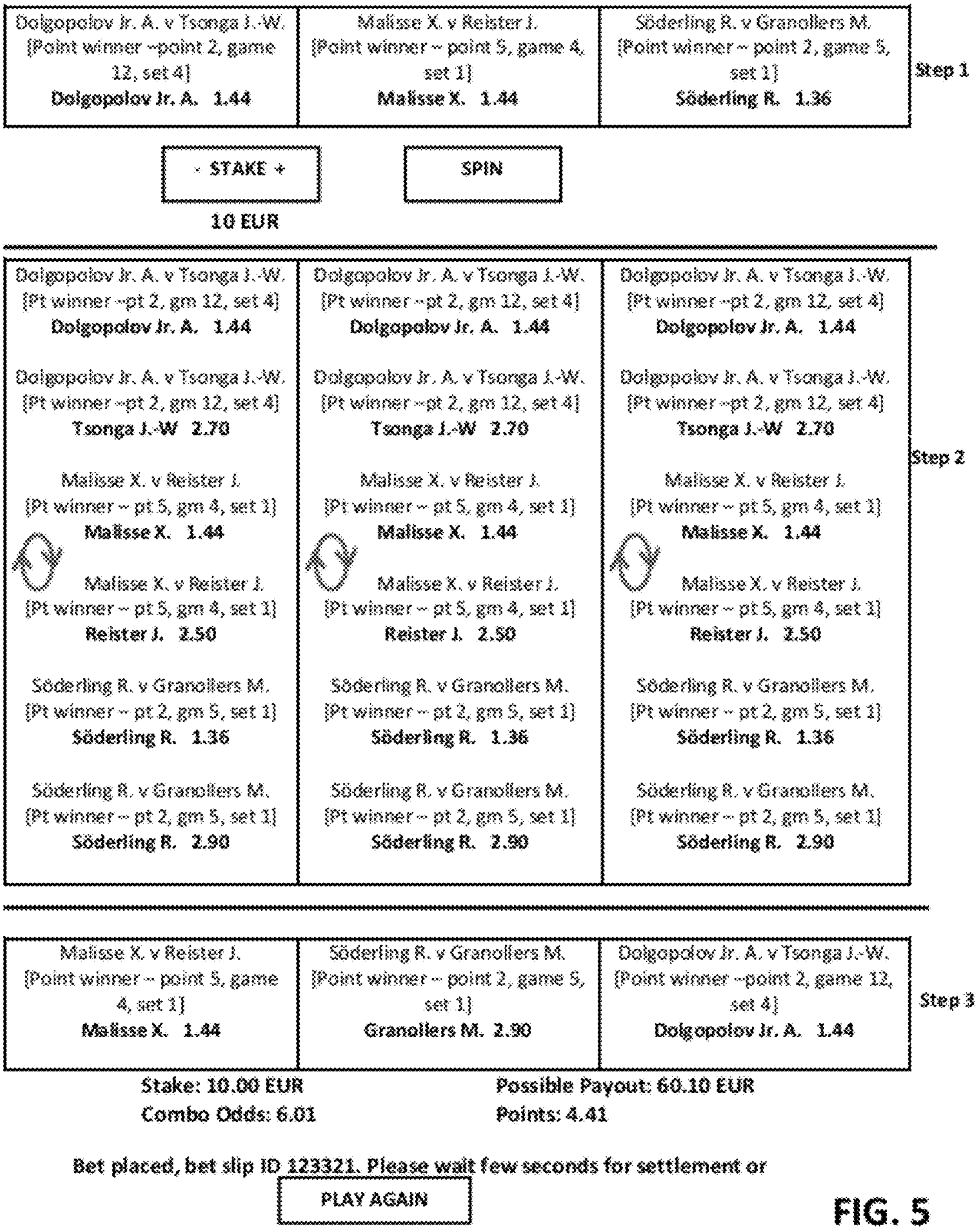
FIG. 5 is a mockup illustrating what may be displayed during three phases: initial, reel spinning, and bet placement.

Once a desired wager amount 42 is reached, the user may select the spin option 44, which may cause one or more of the reels 14, 16, 18 to "spin" or randomly select a bet 20, 22, 24 for that reel, as seen in the mock-up in FIG. 5, step 2. Each reel may include a predetermined number or category of possible bet outcomes. In addition, many betting events may be represented twice in each list of potential outcomes. For example, if the betting event is the winner of a certain point in a certain game/set/match of tennis, the winner could be one player or the other player. Each outcome may be represented, and each outcome may have its own odds of occurring.

In order to place a bet, the system may require that the user log in, thereby identifying the user and retrieving the user's balance information. For example, the "spin" option 44 may be inactive until the user logs in, and the wager information dialog box 46 may be replaced with a notice prompting the user to log in.

Once logged-in, the system may cross-check the user's account balance with the intended bet to verify that the player has sufficient funds to place the bet. Preferably, this cross-check occurs before the reels 14, 16, 18 are spun. If the funds are sufficient, the system may proceed to generate the combination bet and place the wager. If the user's funds are insufficient, the "spin" option 44 may be inactive and/or the user may be prompted to deposit additional funds or lower the wager. Once the user's funds meet or exceed the proposed bet, the spin option 44 may reactivate, and the user may be able to place the bet.

The system may include a random number generator for determining which bet will appear in each reel window 26, 28, 30. Preferably, each reel 14, 16, 18 may be programmed so that the same bet 20, 22, 24 does not appear on more than one reel 14, 16, 18, so that the user may not be able to effectively multiply the potential payout for an event occurring. For example, if a betting event has odds of 1.5:1, having that bet represented on two reels would increase the payout to 2.25:1 (1.5×1.5).

Additionally, the system is configured such that each reel 14, 16, 18 may not stop on a betting event that conflicts with the other betting events. For example, if the betting event 20 for the first reel 14 is player A winning a certain point, the event 22 for a second reel 16 is not player B winning that point, because it would be impossible for the user to win that combination bet.

In this embodiment, once the reels 14, 16, 18 begin to spin, the amount wagered 42 may be locked-in, with the user not knowing details of each bet. In addition, because the wager amount 42 is placed before the betting events 20, 22, 24 are selected, the system may be configured to select only yet-to-occur events, substantially eliminating or significantly reducing the possibility that the player may be unable to place the combination bet because one or more of the events already has passed. For example, failed bet attempts may be limited to situations where the number of possible betting events drops below a minimum threshold in the time between when the user selects the spin option 44 and when the reels stop spinning and the bet would have been placed. This may reduce user frustration and simplify fund accounting.

Figure 3:
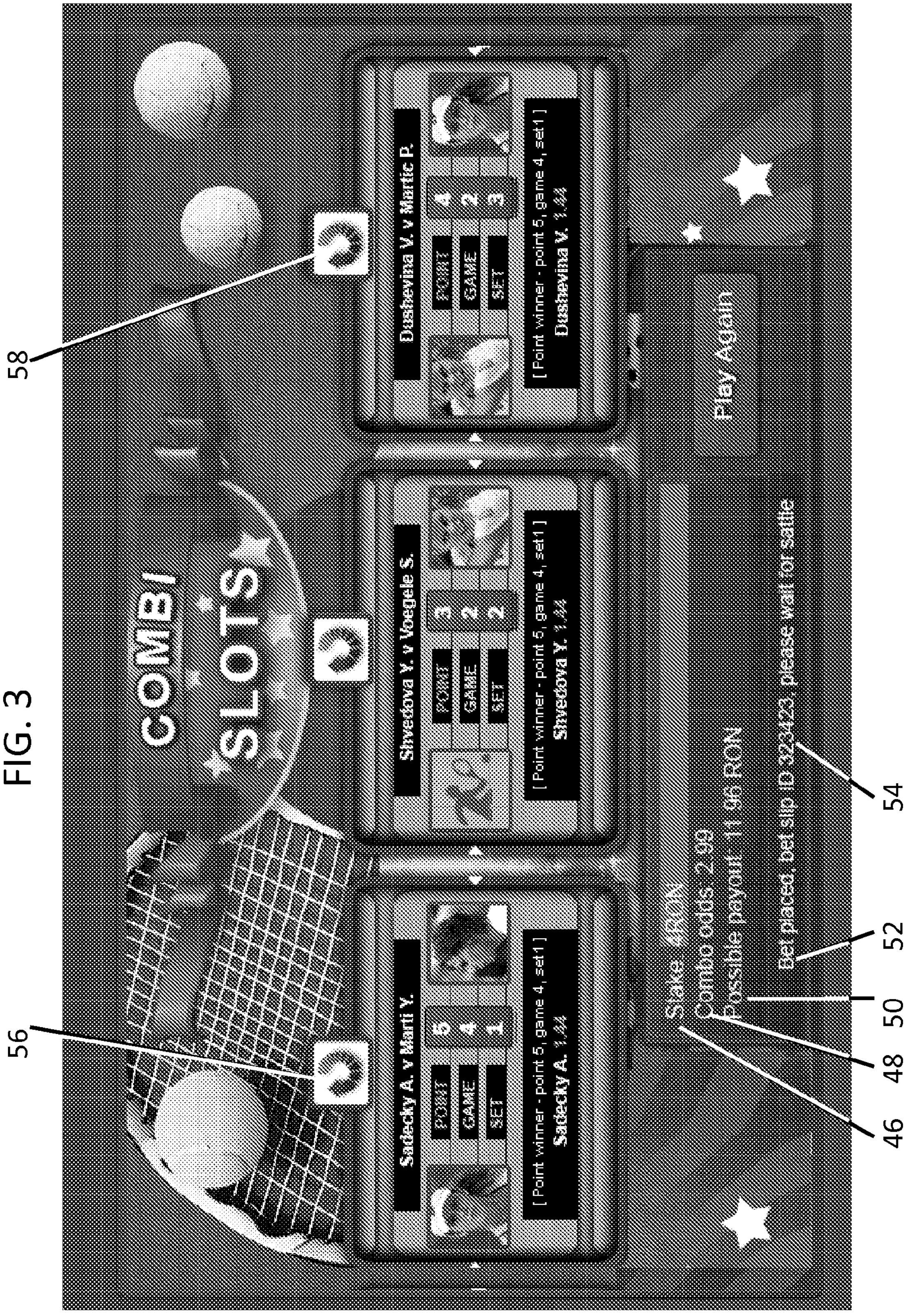
FIG. 3 is a screenshot showing information regarding the user's bet, and status indicators showing the as-yet-unresolved status of each of the in-live betting events.

As seen in FIG. 3, once each reel 14, 16, 18 has finished spinning, the system may display information about each bet to the user. In addition, the display may include a window 46 with information about the combination bet. For example, the system may calculate and display the total amount wagered 42, the combined current odds 48 of the combination bet, and the total possible payout 50. The amount wagered 42 may be displayed in units chosen by the user. For example, the user may choose to place bets in dollars, Euros, pounds, yen, any other currency, or game credits. Combined current odds 48 may be calculated as the product of each individual current odds 34, e.g., for the bets shown in FIG. 3, each bet may have individual current odds of 1.44 (or 1.44:1), so the combined odds may be 1.44×1.44×1.44, or about 2.99 (or 2.99:1). Similarly, total possible payout 50 may be the product of the amount wagered 42 and the combination odds 48, i.e., 4 (bet units)×2.99, or 11.96 bet units.

The system also may include a notification 52 that the combination bet has been placed. Each bet may be assigned a unique identifier 54 so that both the user and system administrator may be able to track and view information on each of the user's bets. The identifiers 54 also may aid the system administrator in accounting, since all bets placed by all users may be discrete and individually identifiable.

As mentioned above, preferably, betting events 20, 22, 24 may be selected from among a group of soon-to-occur events in order to minimize waiting time before resolution of the combination bet. The system may include an estimated time-to-occurrence for each betting event, and the user may be able to customize the system to display potential bets based on this feature. For example, the user may wish to place a combination bet on a currently occurring tennis match and on a horse race happening in two hours, so the user may adjust this factor accordingly. The system also may include a "night mode" or "passive mode" in which the user may be able to place one or more combination bets that may be settled overnight or at a significantly later time, e.g., several minutes or hours later. Instead of keeping the betting window open to see how the bet is settled, this may allow the user to engage in other activities and check the status at his leisure and at a later time, e.g., the next morning.

Preferably, however, the system may default to events happening soon, e.g., within about five minutes, preferably within about one or two minutes, to provide the user with a faster resolution and to allow the system to close out bets more quickly and easily.

Figure 4:
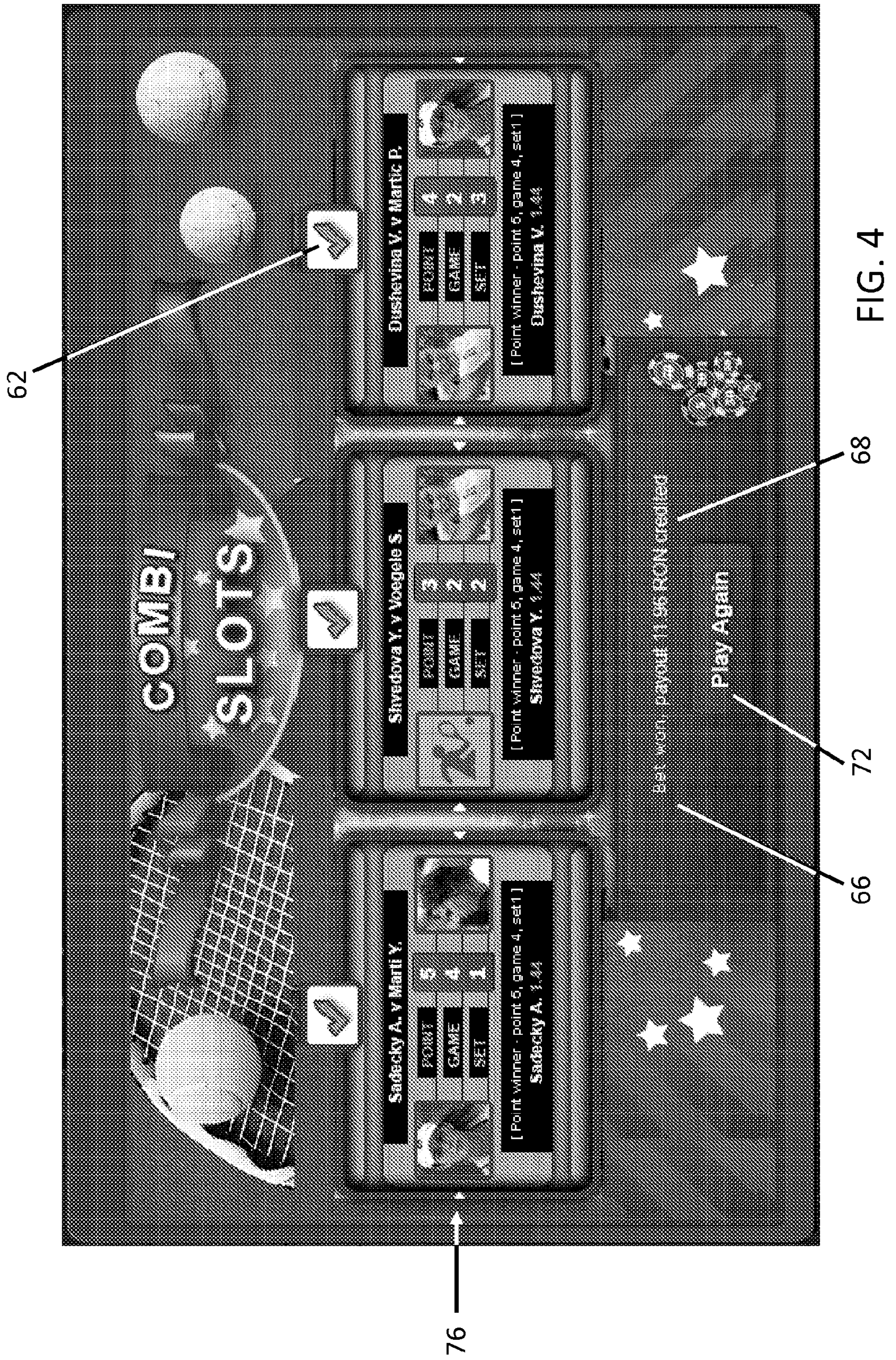
FIG. 4 is a screenshot showing an exemplary winning combination bet.
Figure 6:
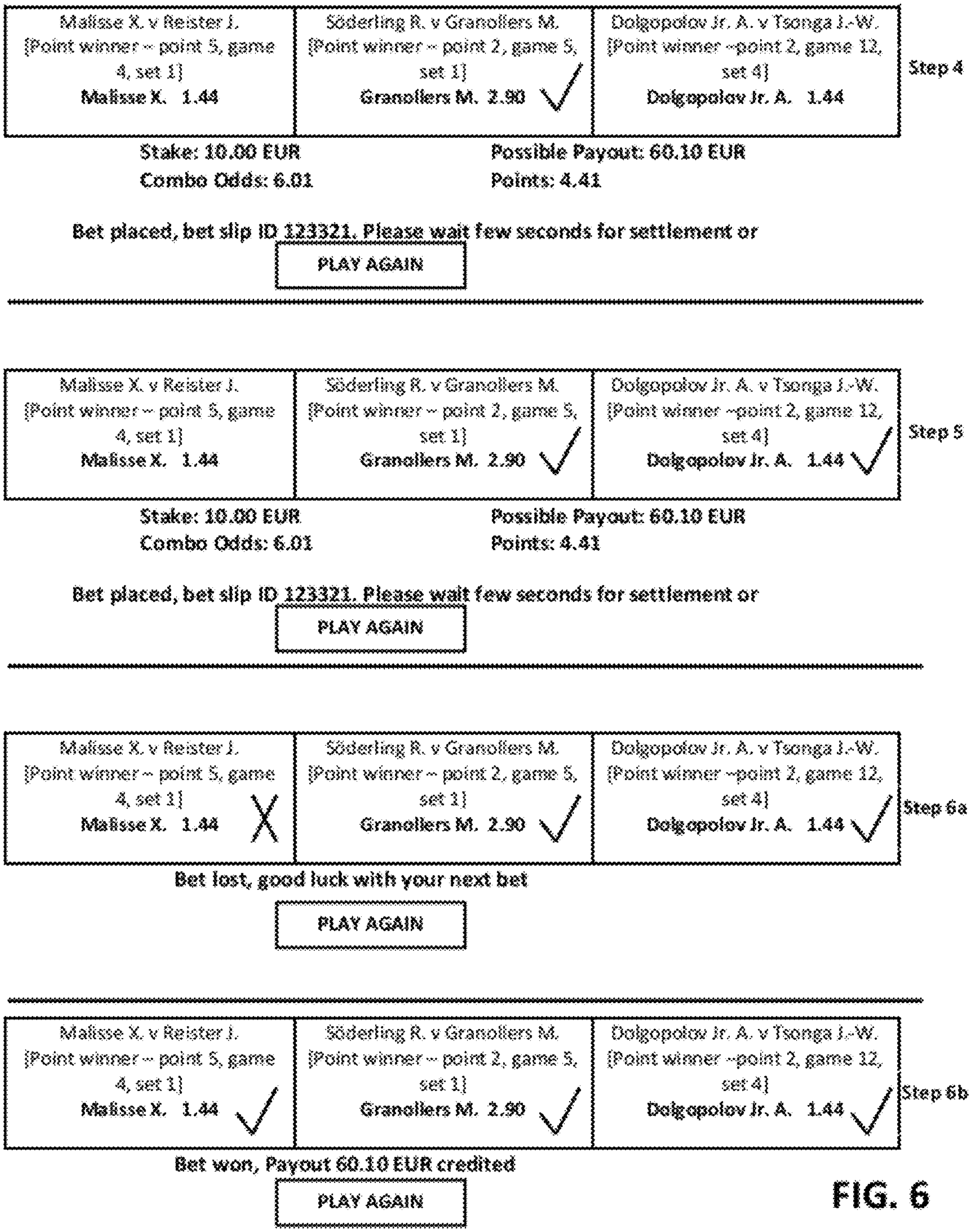
FIG. 6 is a mockup illustrating various stages of bet settling, showing that the system may display the status of each betting event substantially as it occurs.

The system may include status indicators 56 so that the user may keep the display open to determine if the bet wins or loses. As seen in FIG. 3, status indicators 56 may inform the user of the status of the betting events and the combination bet, e.g., they may display a rotating arrow, hourglass icon, or other symbol 58 to indicate that the event is in progress and a bet result has not been determined. Losing bets may result in a red "X" or other predetermined losing symbol 60 being displayed, such as in the mock-up of step **6*a* in FIG. 6. Conversely, as seen in FIGS. 4 and 6, the status indicator 56 may show a green check mark or other predetermined winning symbol 62 if the user wins a particular bet. In the event that a betting event is cancelled, the system may display an indicator 64** such as a gray "X." In this case, the combination bet may be modified to include only the non-cancelled betting events.

The system also may display one or more notifications to the user depending on the bet outcome. If the user wins the bet, the system may notify the user both of the fact that the bet was won 66 and the amount 68 of the payout. If the user loses the bet, the system may notify the user of the loss 70 and wish the user luck with the next bet/prompt 72 the user to place another bet. If the bet is cancelled, the system may notify the user that the bet is cancelled and that the wager is refunded.

Staying with FIGS. 4 and 6, if each individual bet is won, the user wins the combination bet. The system may include video and/or audio notifications alerting the user to the win 66 and to the amount 68 of the payout. This amount may be credited to the user's account to be available for withdrawal or future wagers. Alternatively, the system may allow the user to place an accumulator bet, automatically rolling the payout into an immediately subsequent wager.

Before or after the combination bet results are determined (or at both times), the system may include a "play again" prompt 72 to allow the user to "re-spin" the reels and place another combination bet. This option may be unavailable if the user has insufficient funds tied to his account.

In another embodiment, betting events 20, 22, 24 may be randomly generated or displayed, but the user may be able to select the events to combine prior to placing the bet. In this embodiment, a user interface 10 similar to the previous user interface may be employed, with a few variations. For example, the user may be presented with an interface 10 similar to the one shown in FIGS. 1-4, in which a plurality of betting events is displayed. In this embodiment, the status indicator boxes 56 above the betting events 20, 22, 24 may be used to allow the user to lock in one or more events and have the system randomly select the other events. For example, the user may click within one or more status indicator boxes 56, displaying an icon 62 such as a green check mark to indicate that the user would like to keep those betting events. The user then may select the "spin" option 44 to spin the unselected reel(s), until the user finds a series of events on which to place a combination bet. Similar to the interface of FIG. 2, the display 10 may include a wager or stake toggle 40 allowing the user to adjust the wager 42.

In addition, the display 10 may include a "bet" option to allow the user to place the desired bet. This option may be visible and available at any time to the user. Alternatively, it may not appear until the user has locked in events for all reels shown, which may prevent the user from accidentally placing a bet before a satisfactory combination is achieved.

In both this embodiment and the previous embodiment, the system may update the odds 34 for each betting event as those odds change, substantially in real time. Additionally, in this embodiment, the system may include a notification 64 if one or more of the locked betting events passes. For example, the system may highlight the reel corresponding to that event and then fade it out before populating it with another randomly generated event, or it may display an icon 64 such as a red or gray "X" over the entire reel to provide an easily noticed visual indicator.

For either of the major embodiments described above, the system may incorporate several additional options, as described below.

The system may include a plurality of user options for determining what bets to display. For example, the system may display a table or other list of potential activities and related check-boxes and allow the user to check or otherwise select the activities on which to bet. For example, the user may wish to bet only on tennis matches and basketball games, so the user may select only those options or deselect all other options. The system may include a database of potential bets, each bet including a flag or other indicator of the activity to which it relates. Once the user selects one or more activities, the system may cross-check the selections with the database entries and return only those bets with matching activities as possible wagers.

In one embodiment, this selection may be done on a reel-by-reel basis. For example, for a game having three betting reels 14, 16, 18, the user may select tennis matches only for the first reel 14, basketball games for the second reel 16, and tennis matches, basketball games, and cricket matches for the third reel 18. In another embodiment, the selections may apply to all reels 14, 16, 18 so that the user only has to make the selections once. The system also may include a "select all" option to highlight all possible activities. These options may be modifiable at any time, so that the user easily may be able to customize the combination bets to his interests.

The system also may allow the user to specify his risk tolerance. For example, a player may be more conservative and be willing to risk a lower payout if the odds of winning are adjusted accordingly. Conversely, the user may wish to place bets that are more of a "long shot," knowing that the odds of winning are less, but that the potential payout therefore is greater. To account for the user's risk tolerance, the system may include a toggle option with a plurality of risk tolerances, e.g., "low," "medium," and "high." These tolerances may be linked to predetermined or dynamically adjustable odds ranges.

Alternatively, the system may include one or more slider bars that allow the user to set his upper and/or lower bounds of risk tolerance. The slider bars may move along a scale that displays the odds cutoff so that the user may visually select the odds bounds. The system also may include a color-coded display, proximate or overlapping the scale, to indicate the level of risk chosen by the player. For example, the color-coded display may be a continuum from red, through yellow, to green. Placing the slider in the red zone may indicate a higher risk bet, whereas placing the slider in the green zone may indicate a safer bet.

Once the user selects a risk tolerance or a range of odds, the system may cross-check the odds 34 of each potential bet with that tolerance or those odds. Bets within the chosen range may be displayed, while the system may suppress bets outside the desired range. In addition, because the betting events may be in-live events, and the odds for those bets may change continuously, the system may reevaluate the displayed and suppressed bets to determine whether they remain within or outside the selected range. To simplify this process, the system may flag bets within a predetermined percentage of the cutoff values and evaluate only these bets, or at least evaluate them first. For example, if the user sets a cutoff value of bets having odds of 2:1 or greater, the system may flag all bets within, e.g., about 20% or between about 1.6:1 and about 2.4:1.

Figure 9:
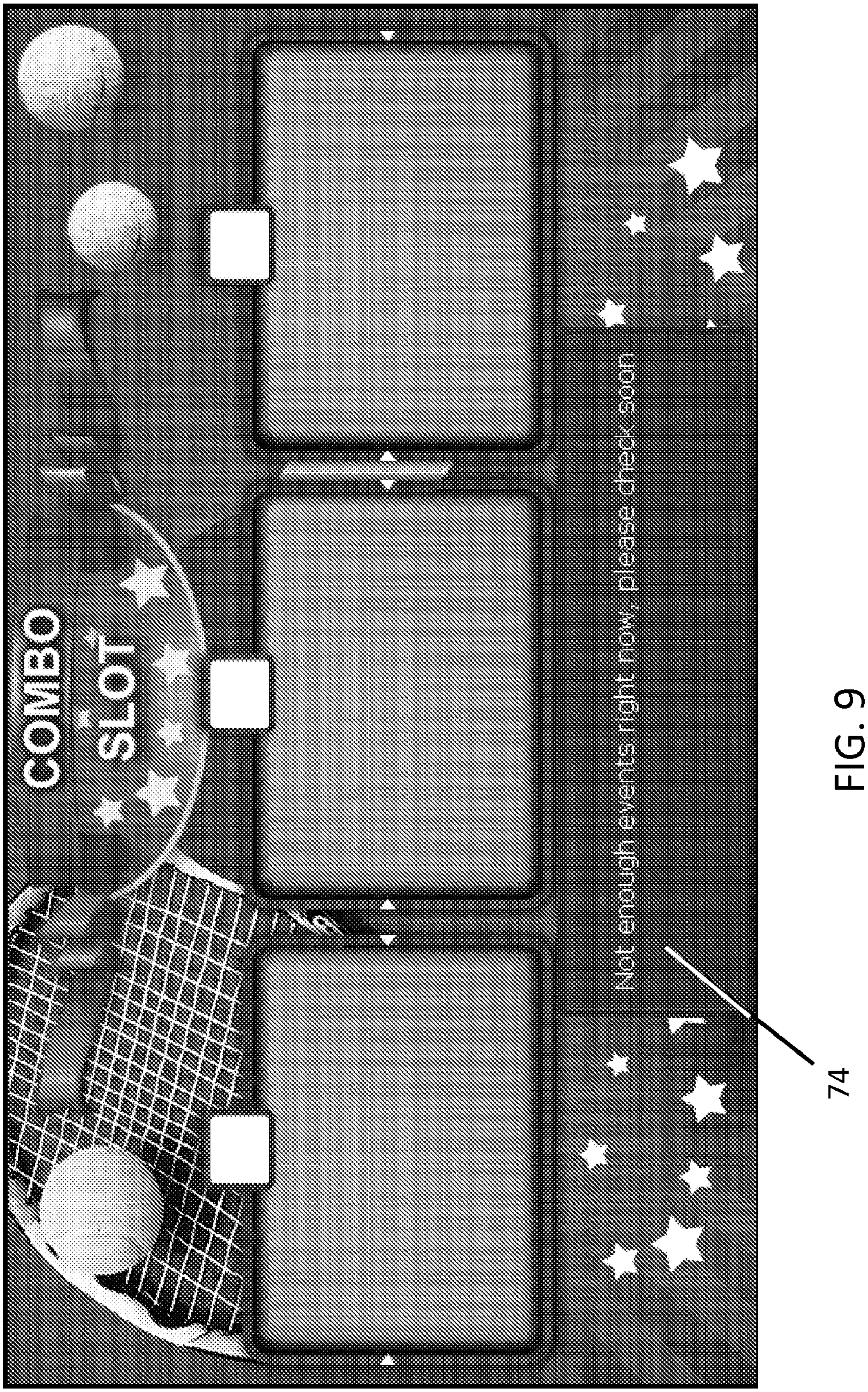
FIG. 9 is a screenshot showing an inactive slot display.
Figure 10:
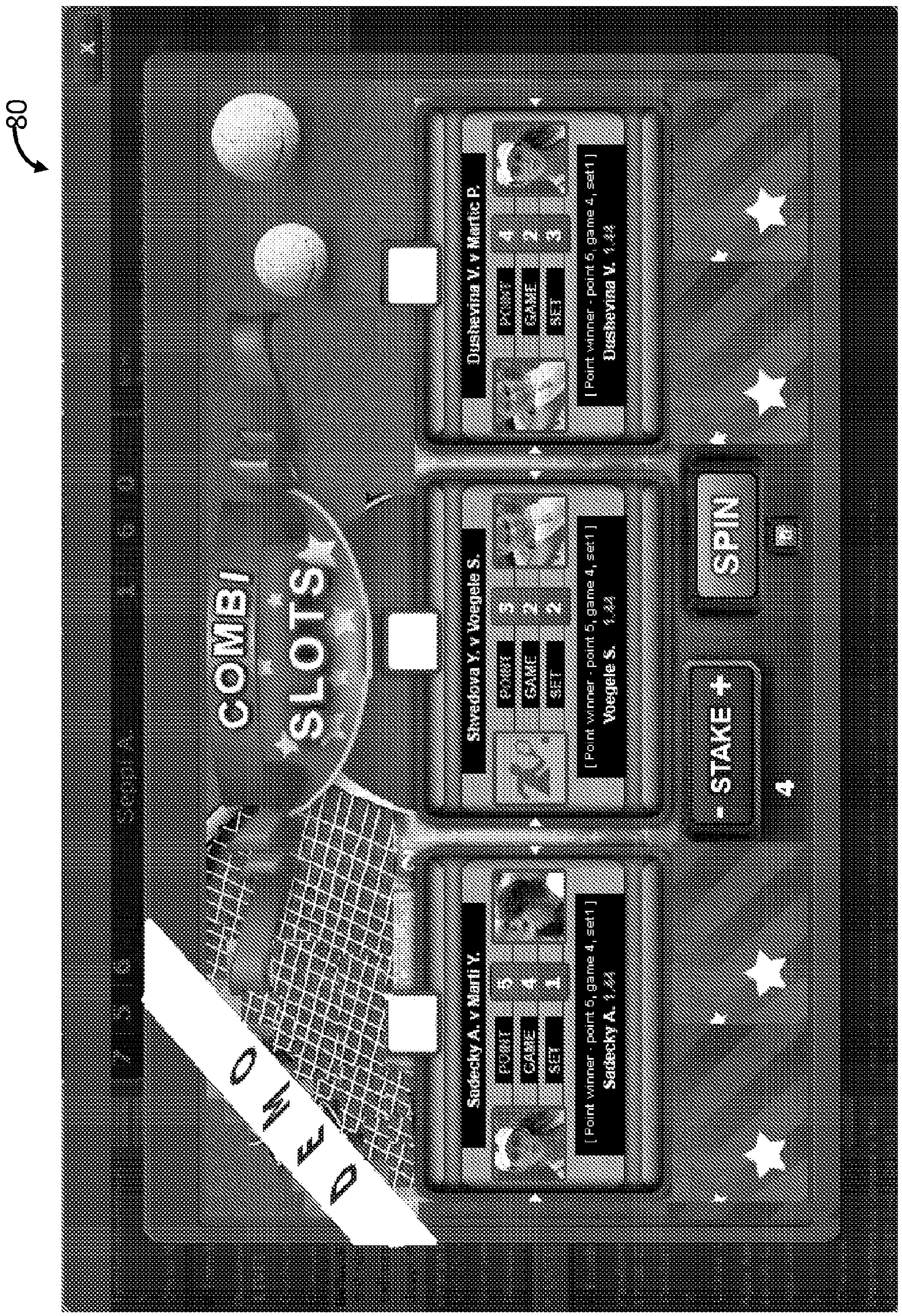
FIG. 10 is a screenshot of a demonstration round initial page.

Depending on the user's preferences or selections, the pool of possible in-live bets may be smaller than the number of slot reels 14, 16, 18. In this case, the system may reduce the number of reels to allow the user to place a smaller combination bet. Preferably, however, the system may provide a textual notification 74 that there are an insufficient number of eligible events meeting the user's criteria. As seen in FIG. 9, the system also may show one or more reels 14, 16, 18 as being grayed-out, empty, or otherwise inactive. For example, all reels may be shown to be inactive to illustrate that the system is not available, or a number of reels corresponding to the number of missing events may be displayed as inactive so that the user may better be able to visualize how many additional betting events are required to activate the system.

Instead of a single payline, the system may include a plurality of paylines, leading to a plurality of combination bets being available at one time. For example, in addition to the standard payline 76, i.e., straight across the center, diagonal paylines such as from top left to bottom right or bottom left to top right may be available. Other multi-payline configurations, similar to those used in multi-line slot machines, may be incorporated into the system. The system may include a "select all" function to allow the user to wager on all possible multi-line combination bets. Alternatively, the system may allow the user to select the paylines on which to wager, e.g., by presenting the user with a list or table of possible paylines from which the user may select. Since the odds of winning the bet do not depend on the location of each event on the reel, total odds and possible payouts may be calculated in substantially the same fashion, regardless off the payline selected. For example, the total odds 48 may be calculated by multiplying the individual odds 34 for each betting event 20, 22, 24, whether the payline is straight across the middle or diagonally.

Once the multiple paylines are selected, the user may place the multiple combination bets at the same time. In the first embodiment described above, this may entail selecting the "spin" option 44, which may populate the bets 20, 22, 24 with randomly generated, unknown betting events. In the second embodiment, the user may be able to select the paylines knowing the randomly generated betting events and may place all bets at the same time by selecting a "bet" option.

Because the system relies on a plurality of reels 14, 16, 18 or a plurality of betting events 20, 22, 24, the system also may include the ability to select and bet on different forms of combination bets. For example, for a three reeled display, the user may be able to place a treble bet that requires winning all three betting events to win the combination. The user also may be able to place three double bets, i.e., bets involving the combination of the first and second reels, the second and third reels, and the first and third reels. These bets may be placed individually or as a single "Trixie" bet.

As the number of reels increases, the number of possible bets also may increase. For example, a four-reeled bet may allow for 6 double bets, 4 treble bets, and a fourfold bet. Again, these bets may be placed individually or as a single "Yankee" bet.

Additional multi-reel bets such as "Canadian" or "Super Yankee," "Heinz," "Super Heinz," "Goliath," or any other type of combination bet may be created and available to the user.

Because the number of possible combination bets may increase by more than a factor of two for every additional reel, the system may include a table or display listing the types of bets alongside radio buttons or check boxes. In this manner, the user may be able to view and choose the possible betting scenarios quickly.

Figure 8:
FIG. 8 is a screenshot showing exemplary placement of a link for launching the combination bet feature.

The system may be configured to run on one or more computers connected via the Internet. Each user computer may access the system, e.g., via an Internet browser or via software that is downloaded to the user's computer, the software configured to access the Internet. The system may be accessed directly or, as shown in FIG. 8, indirectly via a banner or link 78 in another gaming window. For example, the link 78 may be placed on another in-live betting system to attract players interested in in-live betting. This link 78 may disappear if one or more predetermined criteria are not met, e.g., if an insufficient number of betting events or events matching the user's desired subject matter or odds criteria exist, or if an insufficient number of betting events exist with odds greater than a predetermined system value.

The latter case may protect the house by setting a lowest-odds threshold that the player cannot go below, e.g., below odds of about 1:1. This same criterion may be used generate the pool or database of potential betting events described above.

In addition, the system may include a secured log-in procedure to identify and verify the user, to retrieve the user's account details, to allow the user to modify those details, and to allow the user to bet with the funds in the account.

Figure 15:
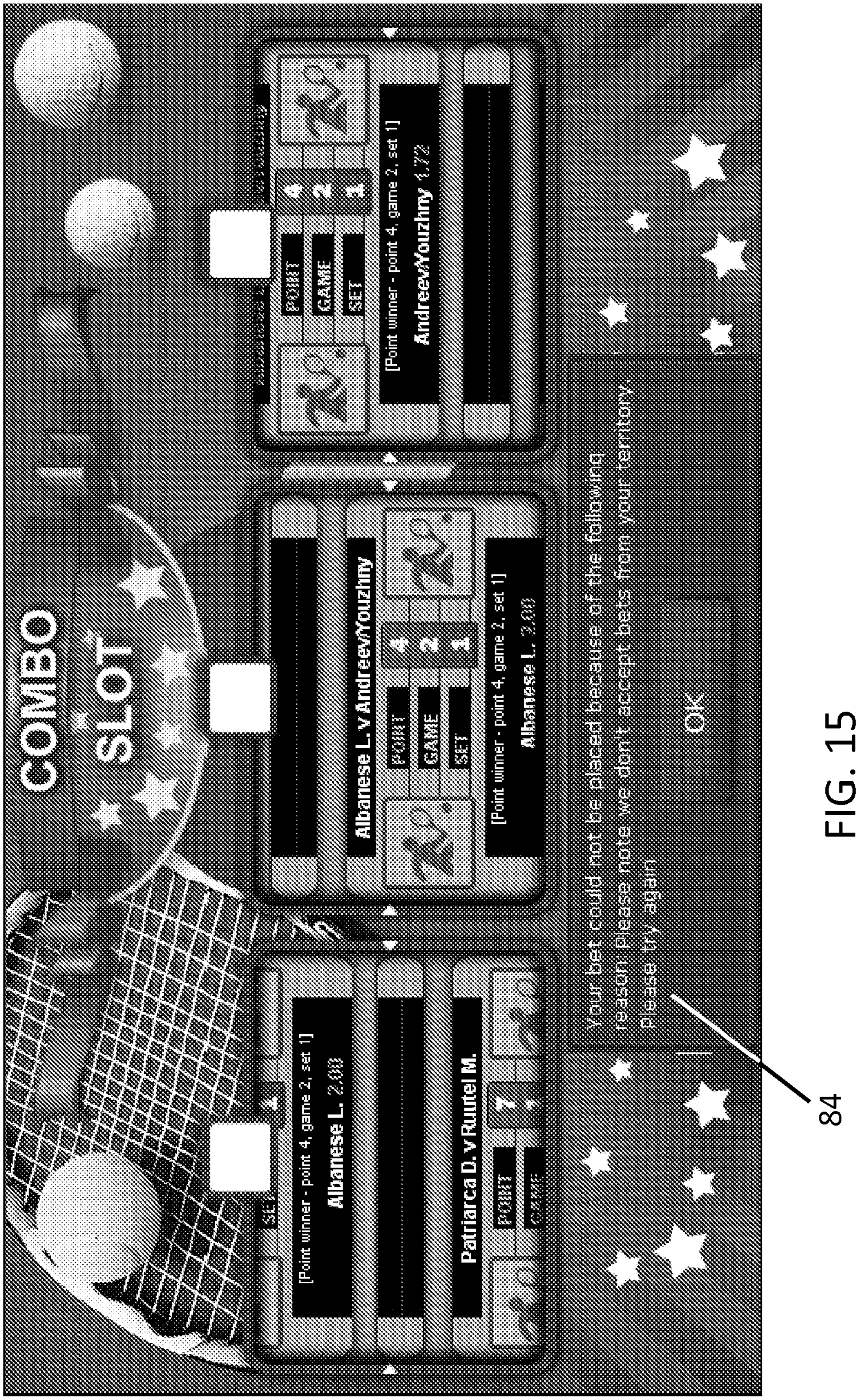
FIG. 15 is a screenshot displaying an error message regarding bet placement due to geographical restraints.

Turning to FIGS. 10-14, the system may include a demonstration feature 80 so that potential users may learn how to use the system without having to wager their own funds. Selecting the demonstration option 82 may launch a mock-version of the game. The mock-version may show the user how to place a bet, how to spin the reels to determine which bets will be part of the combi-bet, and how to view and analyze the user interface to determine whether the combi-bet is a winner. At any point during the demonstration, the system may allow the user to exit the demonstration and proceed to the actual wagering portion of the system As discussed above, the system may require that the user log-in, allowing the system to identify the user. The user may be required to provide the system with identifying information, including, e.g., geographic information. Additionally or alternatively, the system may obtain the user's geographic information by querying the user's IP address. In this manner, the system may be configured to limit use to jurisdictions where in-live betting and combination betting are permitted. Should a user from another jurisdiction attempt to use the system, the user may be notified 84 that bets are not accepted from that area, and the betting options may be disabled, as seen in FIG. 15.

While the foregoing written description of the invention enables one of ordinary skill to make and use what is considered presently to be the best mode thereof, those of ordinary skill will understand and appreciate the existence of variations, combinations, and equivalents of the specific exemplary embodiments and methods herein. The invention should therefore not be limited by the above described embodiments and methods, but by all embodiments and methods within the scope and spirit of the invention as claimed.

What is claimed is:

1. A method for generating and receiving a combination bet, the method implemented on one or more computer including one or more processors, the method comprising:

establishing a plurality of betting events;

receiving, via a user interface operatively coupled to the one or more computers, a total wager amount;

randomly selecting a subset of said plurality of betting events;

verifying, via at least one of said processors, that each event in said subset has not occurred;

accepting said combination bet; and determining, via at least one of said processors, whether said combination bet is a winner.

2. A method according to claim 1, further comprising:

displaying said subset to a user as entries in a plurality of slot machine-type reels.

3. A method according to claim 1, wherein said determining step comprises:

determining whether each event in said subset is a winner.

4. A method according to claim 1, wherein said establishing step comprises:

receiving a user-defined list of betting event categories;

cross-checking available betting events with said categories; and selecting available betting events matching said categories.

5. A method according to claim 1, wherein said establishing step comprises:

receiving a user-defined range of acceptable odds for each event;

cross-checking odds for each available betting event with said range; and selecting available betting events falling within said range.

6. A method according to claim 5, further comprising:

updating odds for each available betting event;

cross-checking said updated odds for each available betting event with said range; and updating said plurality of betting events to include events with updated odds falling within said range and to remove events with update odds falling outside said range.

7. A method according to claim 1, further comprising:

indicating a status of each event in said subset; and displaying an update to said status when said status changes.

8. A method operable on one or more computers, each computer including a processor, for generating and receiving a combination bet, comprising:

establishing a plurality of betting events;

randomly selecting, via a processor, a first subset of events from said plurality of betting events;

displaying said first subset of events to a user on a screen operatively coupled to a computer;

processing, via a processor, a request from said user to keep or discard one or more events within said subset;

randomly selecting, via a processor, a second subset of events from said plurality of betting events;

replacing discarded events with said second subset of events;

establishing a combination bet comprising kept events from said first subset and said second subset; and receiving a wager for said combination bet.

9. A method according to claim 8, wherein said displaying step comprises:

displaying a plurality of slot-machine-like reels; and inserting a separate event from said first subset in each of said reels.

10. A method according to claim 9, wherein said selecting steps comprise:

cycling between potential betting events to imitate spinning slot machine reels.

11. A method according to claim 8, further comprising:

calculating odds for said combination bet;

calculating a possible payout for said combination bet; and displaying said wager, said odds, and said possible payout.

12. A method according to claim 8, wherein said selecting steps comprise:

verifying that each event in said subsets does not conflict with any other event in said subsets.

13. A method according to claim 8, wherein said selecting steps comprise:

verifying that each event in said subsets is not a duplicate of any other event in said subsets.

14. A method according to claim 8, further comprising:

displaying odds for each event in said first subset and said second subset; and updating said odds substantially in real time.

15. A method according to claim 8, wherein said plurality of betting events are ongoing sporting events.

16. A system for generating and receiving a combination bet, comprising:

a user interface for displaying a plurality of betting events, wherein said events are arranged to resemble a plurality of slot machine reels, and a combination bet comprises combining a bet from each reel such that the system is configured for a combination bet to be successful if each bet for each of said events is successful;

said user interface further comprising: a toggle for adjusting a bet amount and status indicators for each displayed betting event; and a database for storing information relating to said plurality of betting events.

17. A system according to claim 16, wherein, for each event, said information comprises:

an event identifier, an event-type identifier, event participants, and odds for said event.

18. A system according to claim 17, wherein said system is configured to update said odds substantially in real time.

19. A system according to claim 16, said user interface further comprising:

a user-selectable list of event types, wherein said displayed plurality of betting events have an event type matching a user-selected event type.

20. A system according to claim 16, wherein said system is configured to update said status identifiers to reflect a win or a loss as each betting event is resolved.

* * * * *